(12) United States Patent
Berry et al.

(10) Patent No.: US 7,023,876 B2
(45) Date of Patent: Apr. 4, 2006

(54) POINT-TO-POINT PROTOCOL

(75) Inventors: David Ray Berry, Colorado Springs, CO (US); Daniel Brian McGee, Colorado Springs, CO (US); Susan Jane Gray, Colorado Springs, CO (US)

(73) Assignee: Quantum Corporation, San Jose, CA (US)

( * ) Notice: Subject to any disclaimer, the term of this patent is extended or adjusted under 35 U.S.C. 154(b) by 799 days.

(21) Appl. No.: 09/902,433

(22) Filed: Jul. 9, 2001

(65) Prior Publication Data

US 2003/0007504 A1   Jan. 9, 2003

(51) Int. Cl.
  *H04J 3/16* (2006.01)

(52) U.S. Cl. ..................... 370/465; 709/227

(58) Field of Classification Search ............ 370/235, 370/392, 465, 401, 252; 709/227, 228, 229
See application file for complete search history.

(56) References Cited

U.S. PATENT DOCUMENTS

| | | | | |
|---|---|---|---|---|
| 5,551,068 | A * | 8/1996 | Goldsmith et al. | 370/466 |
| 5,748,915 | A * | 5/1998 | Iijima | 710/105 |
| 5,786,921 | A | 7/1998 | Wang et al. | |
| 5,850,189 | A | 12/1998 | Sakanaka et al. | 340/825.72 |
| 5,966,636 | A * | 10/1999 | Corrigan et al. | 725/116 |
| 5,983,274 | A | 11/1999 | Hyder et al. | 709/230 |
| 6,002,960 | A * | 12/1999 | Sternberger et al. | 600/546 |
| 6,125,116 | A * | 9/2000 | Dighe et al. | 370/395.1 |
| 6,160,808 | A * | 12/2000 | Maurya | 370/392 |
| 6,211,797 | B1 | 4/2001 | Kimura | 340/825.72 |
| 6,366,589 | B1 * | 4/2002 | Naudus et al. | 370/468 |
| 6,404,807 | B1 * | 6/2002 | Mehrabanzad et al. | 370/465 |
| 6,590,865 | B1 * | 7/2003 | Ibaraki et al. | 370/235 |
| 6,754,228 | B1 * | 6/2004 | Ludwig | 370/468 |
| 6,757,255 | B1 * | 6/2004 | Aoki et al. | 370/252 |

FOREIGN PATENT DOCUMENTS

| | | |
|---|---|---|
| WO | WO-95/28777 A1 | 10/1995 |
| WO | WO-97/25788 A1 | 7/1997 |
| WO | WO-99/26364 A1 | 5/1999 |
| WO | WO-00/62481 A1 | 10/2000 |

OTHER PUBLICATIONS

European Search Report mailed Jan. 11, 2005 for EP patent application No. 02254745.9, 3 pages.

* cited by examiner

*Primary Examiner*—Andy Lee
(74) *Attorney, Agent, or Firm*—Morrison & Foerster LLP

(57) ABSTRACT

A Point-to-point protocol configured to provide communication exchange between a first device and a second device. The point-to-point protocol is configured to negotiate an exchange rate and establish a connection for the communication exchange between the first and second device. As system dynamics change, the point-to-point protocol is also configured to permit application programs in the first device and the second device to request renegotiation of the exchange rate at any time. The point-to-point protocol is also configured to provide confirmation to a sending application program that information was delivered to a receiving application program.

39 Claims, 11 Drawing Sheets

| Device 600 | Control 601 | Source Add. 602 | Destination Add. 603 | Mess. Seq. 604 | Mess. ACK. 605 | Length 606 | Data 607 | Reserve 608 |

| Received message in Device 100 | Responsive Action by Device 100 |
|---|---|
| Information message where data validation fails | Delete message - increment statistic |
| Information message where sequence validation fails | Supervisory reject |
| Receive time-out condition | Ignore received characters |
| Validated Information message | Supervisory receiver ready or not ready |
| Test message | Test ACK. |
| Reset message | Reset link |
| Synchronization request message | Synchronization ACK. message |
| Message reject | Report to application program and continue |
| Abort sequence message | Abort current receive message |

FIG. 9

| Received message in Device 100 | Responsive Action by Sending Device 101 |
|---|---|
| Synchronization request message | Connection down reset state machine or renegotiate rate |
| Supervisory receiver ready message | Message sent successfully |
| Time-out (no response) | Re-send message |
| Supervisory reject message (Reject) | Re-send requested message |
| Supervisory receiver not ready message | Start timer |
| Message reject | Delete message, send indication to app. program |

FIG. 10

POINT-TO-POINT PROTOCOL

FIELD OF THE INVENTION

The invention is related to the field of communications, and in particular, to a protocol for point-to-point communications between a pair of devices.

BACKGROUND OF THE INVENTION

There exist numerous protocols defining rule sets that govern communication between devices. These protocols identify a common language and basic functionality, such as, routing, error detection, error correction, addressing, and the order in which the devices communicate with each other.

One example of such a protocol is the Infrared Data Association ("IRDA") protocol. The IRDA protocol defines a link protocol for serial infrared links. The IRDA protocol sets forth a common set of rules that devices operate in accordance with to communicate over a wireless air interface using infrared light. The IRDA protocol defines basic functionality such as link initialization, device address discovery, connection start-up, including link negotiation, information exchange, disconnection, link shutdown, and device address conflict resolution.

Operationally, application programs located on two different devices can interact and communicate with one another using an IRDA port and the rules defined by the IRDA protocol. The application programs contain functions for particular application services, such as file transfer, remote file access, and virtual terminals. A service access method provides the interface between the IRDA protocol layer and the application program layer. The communications are provided to the service access method by the applications in the application program layer. The data input to the service access method is modulated into infrared signals by an infrared modem and exchanged over the IRDA port with another similarly configured device according to the rule set defined in the IRDA protocol. The receiving device demodulates the data and provides the data to an application program in its own application program layer.

Another type of protocol used in communication between devices is a transmission control protocol/Internet protocol ("TCP/IP"). TCP/IP is a networking protocol that provides communication across interconnected networks between computers with diverse hardware architectures and operating systems. Operationally, TCP/IP messages from an application program layer of one device are divided into smaller segments called packets. The packets each include a sequence number that indicates the order of the segment within the message. The destination device receives and checks the packets for error conditions. If no error condition exists, the packets are routed to the application layer and the receiving protocol layer provides an acknowledgment message to the sending protocol layer confirming the packet receipt.

Unfortunately, prior art protocols such as the IRDA and TCP/IP protocol do not provide flexibility in the exchange rate for communications between devices. Rather the exchange rate is set by the modulation/demodulation scheme defined by the device hardware. Thus, if the dynamics of the system change, inefficiency in the utilization of system resources could result. For example, if an application program needs to exchange a large communication, and the system is operating at a 20% resource utilization, the application program cannot utilize the available resources to transfer the communication at a faster exchange rate, but rather, is limited to the exchange rate defined in the device hardware, while the remaining 80% of the resources remain idle.

Another problem with prior art protocols is that the acknowledgment message is received by the sending protocol layer and not the sending application program. The sending application program does not have knowledge that a communication was received. Thus, if the sending protocol layer does not receive the acknowledgment message, the application program does not have knowledge of the condition until a time-out error condition occurs. This results in synchronization errors as application programs in one device continue to send information to another device without knowledge of an error condition until a time-out error occurs.

SUMMARY OF THE INVENTION

The present point-to-point protocol advances the art by providing a protocol that negotiates an exchange rate for communications between a pair of devices and permits the application program layer of either device to request renegotiation of the exchange rate at any time. The present protocol also provides a confirmation to the sending application program layer that an acknowledgment message was received.

According to the present protocol, an exchange rate for communications between devices is automatically negotiated by the protocol and a connection established during an initialization process invoked during device start-up. As system dynamics change, the initialization process may be re-invoked at any time by an application program to renegotiate the exchange rate over the connection. Additionally an application can request a higher or lower exchange rate depending on the requirement of the requesting application program. Furthermore, the initialization process may also be re-invoked by the protocol layer in response to unrecoverable errors that occur during communication exchange.

During a renegotiation of the exchange rate, an application program suggests a desired exchange rate to the protocol layer. Typically, the suggested exchange rate is the highest exchange rate currently supported by the device. The protocol layer provides a synchronization request message that includes the suggested exchange rate to the other device's protocol layer. The other device's protocol layer responds with a synchronization acknowledgment message that includes an exchange rate that is equal to or lower than the suggested exchange rate provided in the synchronization request message. Typically, the exchange rate provided in the synchronization acknowledgment message is the highest exchange rate currently supported by the other device that is equal to or lower than the suggested exchange rate. Advantageously, this permits application programs to suggest the highest possible exchange rate currently supported between two devices.

Responsive to renegotiating the exchange rate, the protocol layers test the exchange rate to confirm that the connection supports the renegotiated exchange rate and provides reliable communication exchange between the devices. The testing confirms the reliability of providing multiple transmissions over the connection at the renegotiated exchange rate. If during testing, the protocol layer determines the connection cannot support multiple transmissions at the renegotiated exchange rate, the protocol layer again renegotiates the exchange rate to a lower reliable exchange rate. Advantageously, the testing permits applications to suggest higher exchange rates to the protocol layer, but does not allow an application to monopolize processing time and central processing unit resources allocated to the protocol layer. The present protocol merely allows applications to influence how the protocol utilizes allocated resources without turning over ultimate control of system resources. Also advantageously, the present protocol permits a system to be deterministic, in that it allows the applications, which have knowledge of the amount of central processing unit ("CPU") and data bandwidth resources they require, to determine the quality of service by requesting the use of more or less of those resources. In other words the present protocol marries the two limiting factors in an information exchange system, namely, the bandwidth of the physical connection and the bandwidth of the CPU, and utilizes both efficiently.

Another advantage of the present protocol is that the highest possible exchange rate is negotiated for the exchange of communications over a connection between a pair of devices. Another advantage of the present protocol is that it is not a master slave protocol, but rather, permits either device to initiate commands. Another advantage of the present protocol is that it includes a cyclic redundancy check ("CRC") for error detection and reliable communication exchange. Another advantage of the present protocol is that the initialization process may be invoked at any time by an application program to re-negotiate the exchange rate. Another advantage of the present protocol is that the initialization process may also be invoked at any time by the protocol in response to error conditions or application's request. Another advantage of the present protocol is that a sending application program is notified when communications are received and acknowledged by the receiving device. Those skilled in the art will recognize additional advantages of the present invention by reference to the following figures and detailed description.

BRIEF DESCRIPTION OF THE DRAWINGS

The same reference number represents the same element on all drawings.

FIG. 6 is an example of payload fields for the fundamental message of FIG. 5;

FIG. 9 is a logical diagram of messages and responses for the protocol according to the present invention;

FIG. 10 is another logical diagram of messages and responses for the protocol according to the present invention.

DETAILED DESCRIPTION

Figure 1:
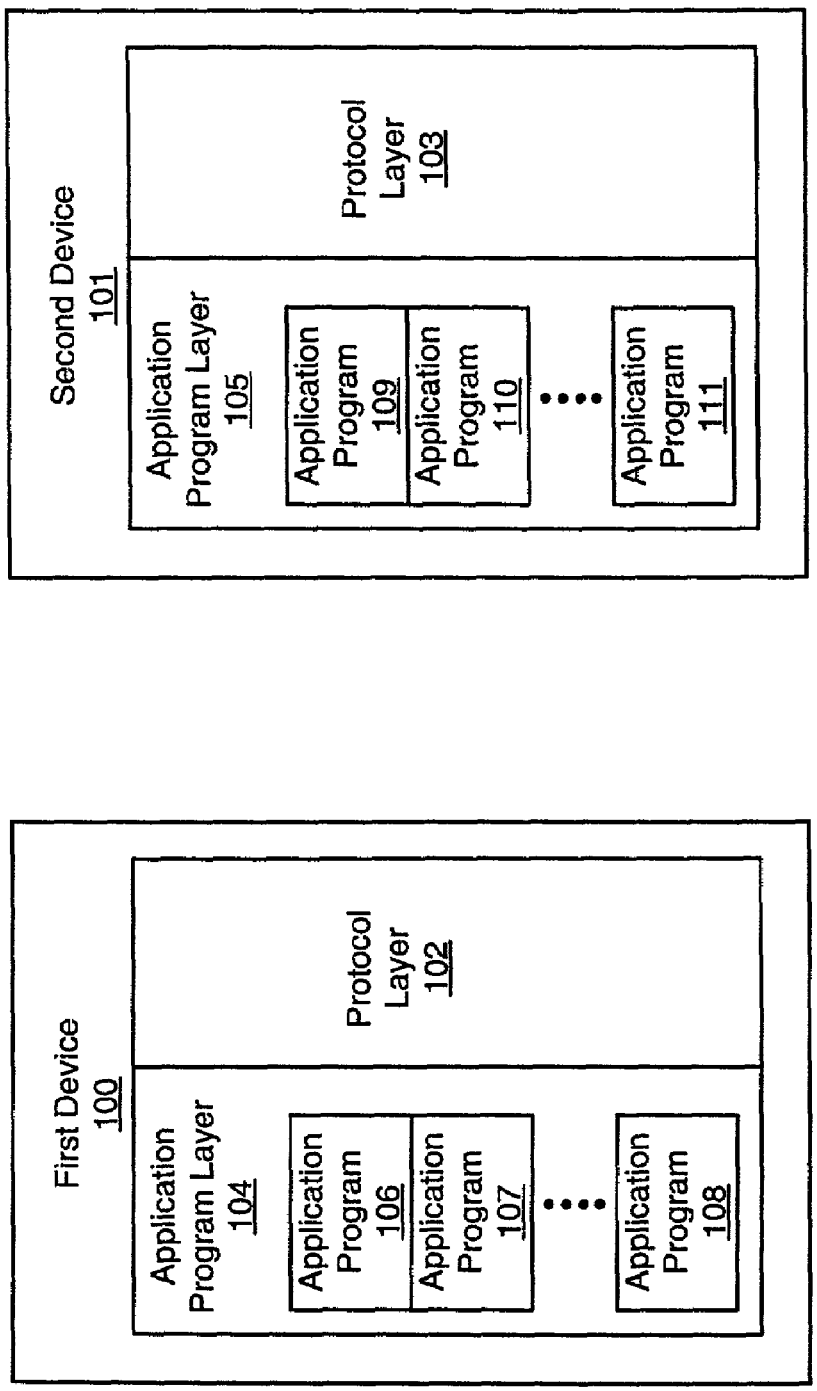
FIG. 1 illustrates a system architecture for the protocol according to the present invention.
Figure 2:
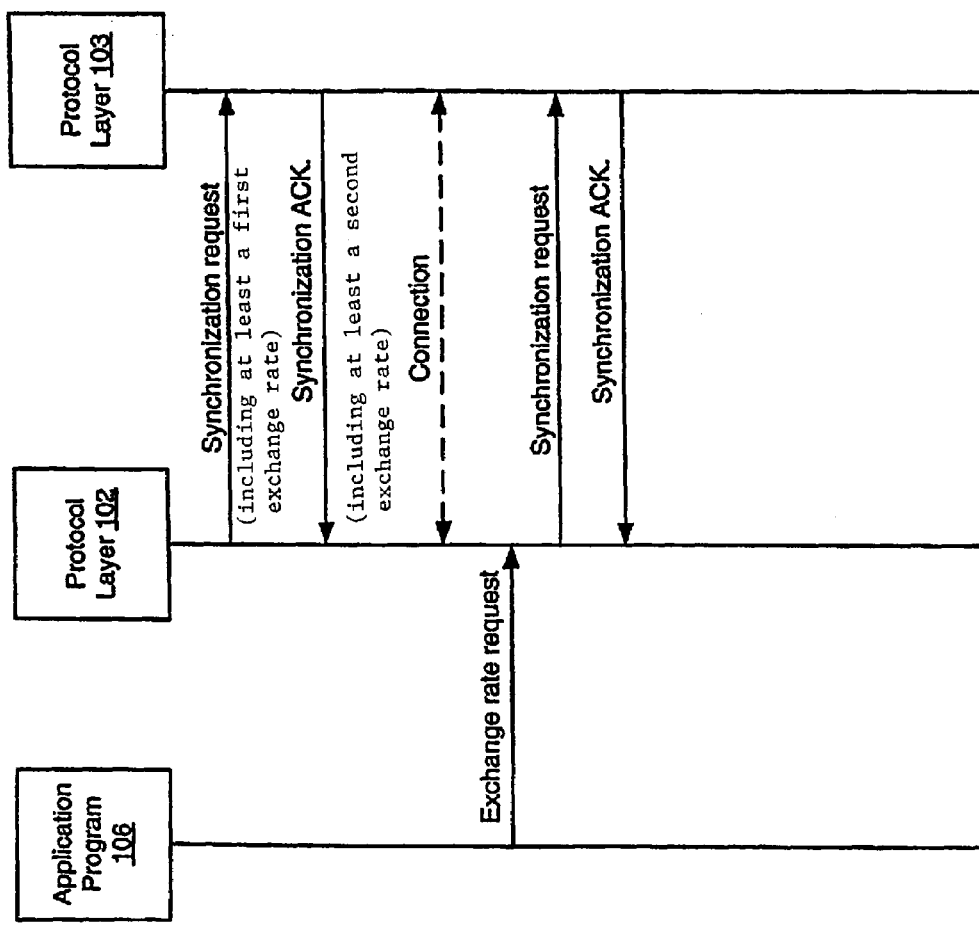
FIG. 2 is a message sequence chart illustrating one example of the operation of the protocol according to the present invention.
Figure 3:
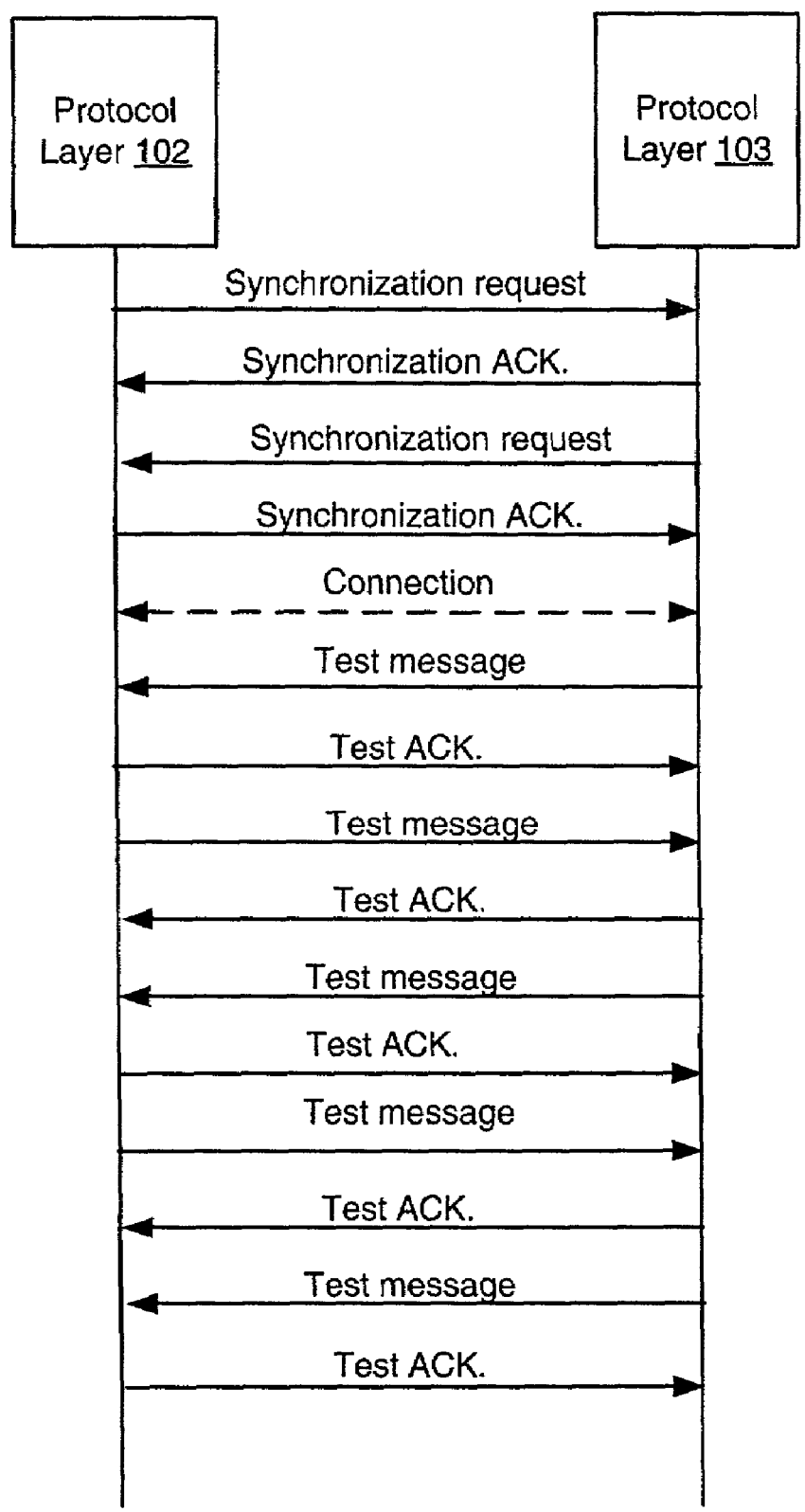
FIG. 3 is a message sequence chart illustrating another example of the operation of the protocol according to the present invention.

System Configuration and Operation FIGS. 1–3:

The present point-to-point protocol is configured to provide reliable communication exchange between a pair of devices. Advantageously, the present protocol does not rely on a master slave relationship between devices, but rather, permits the initiation and exchange of communications by either device. The communications could be any type of digital communications with one example being packet communications. Also advantageously, the present protocol includes cyclic redundancy check ("CRC") error detection to provide for reliable communication exchange between devices.

The present protocol includes three primary message types, namely, unnumbered messages, information messages, and supervisory messages. As will become apparent from the following description, however, other messages such as time-out messages and link-reset messages are also used to implement the principles of the present invention.

The unnumbered messages are used by the protocol to negotiate the exchange rate and establish the connection for communications between the pair of devices. The unnumbered messages are also used to test the connection at the negotiated exchange rate by exchanging test messages in full duplex mode between the pair of devices. In the context of the present invention, the unnumbered messages are defined as messages that do not include a message sequence number.

The information messages are used by the protocol to exchange communications between the devices. The communications could be any communications supported by the devices. Some examples of the communications include without limitation, voice, video and data communications. The information messages are acknowledged by supervisory messages provided by a receiving protocol layer back to a sending protocol layer. If a supervisory message is not received in response to the transmission of an information message within a pre-determined time-out period, the sending protocol layer re-transmits the information message to the receiving protocol layer. If a supervisory message is still not received after a predetermined number of transmittal attempts, the initialization process is invoked and the exchange rate is renegotiated between the two devices.

The supervisory messages are used by the protocol to acknowledge the receipt and validation of information messages and/or to provide error information. To acknowledge a proper receipt of an information message, a supervisory receiver ready message is provided in response to the information message. The supervisory receiver ready message includes a sequence acknowledgment for the next information message sequence number and indicates that the receiving device is ready for the next information message. To acknowledge an error in the receipt of an information message, a supervisory reject message is provided in response to the information message. If a receiver buffer is full, a supervisory receiver not ready message is provided in response to the information message. The supervisory receiver not ready message includes the sequence acknowledgement for the next information sequence number and indicates that the device is not ready to receive new information messages. The supervisory receiver not ready message is sent prior to a timeout message and is continuously sent until resources in the receiver buffer are freed.

FIG. 1 depicts a pair of devices, namely, a first device 100 and a second device 101. The first device 100 comprises a point-to-point protocol layer 102 according to the present invention and an application program layer 104. The application program layer 104 comprises application programs 106–108. The second device 101 comprises a point-to-point protocol layer 103 according to the present invention and an application program layer 105. The application program layer 105 comprises application programs 109–111.

The application programs 106–111 could be conventional application programs running on the devices 100 and 101. Those skilled in the art will appreciate that the application program layers, 104 and 105, could include numerous other application programs although only application programs 106–111 are shown on FIG. 1 for clarity.

The protocol layers, 102 and 103, could be any instructions that are stored on a storage media and are configured to automatically negotiate an exchange rate and establish a connection for the exchange of communications at the negotiated exchange rate between the devices, 100 and 101. The protocol layers, 102 and 103, are also configured to receive suggested exchange rates from the application program layers, 104 and 105, and renegotiate the exchange rate over the connection based on the suggested exchange rates received from the application program layers, 104 and 105. The protocol layers, 102 and 103, are also configured to test the renegotiated exchange rate to confirm that the connection supports the rate and provides reliable communication exchange between the devices, 100 and 101.

The instructions could be retrieved and executed by one or more processors. Some examples of the instructions are Software, program code, and firmware. Some examples of storage media are memory devices, tape, disks, integrated circuits, and servers. The instructions are operational when executed by the one or more processors to direct the processors to operate in accord with the invention. The term "processor" refers to a single processing device or a group of inter-operational processing devices. Some examples of processors are integrated circuits and logic circuitry. Those skilled in the art are familiar with instructions, processors, and storage media.

Operationally, the protocol layers, 102 and 103, perform an exchange rate negotiation and connection establishment during an initialization process invoked during device start-up. The initialization process is then re-invoked at the request of the application programs 106–111 to renegotiate the exchange rate based on a suggested exchange rate provided to the protocol layers, 102 and 103, by the requesting one of the application program 106–111. The protocol layers, 102 and 103, also invoke the initialization process in response to unrecoverable errors that occur during a communication exchange over the connection between the devices 100 and 101.

The devices, 100 and 101, could be any devices where point-to-point digital communication exchange is desired. Some examples of the devices, 100 and 101, include without limitation, tape drives, hard drives, tape library systems, notebook computers, desktop computers, and workstations.

FIG. 2 is a message sequence chart illustrating one example of the initialization operation and a renegotiation operation according to the present invention. On FIG. 2, the initialization process is invoked in the protocol layers, 102 and 103, when the devices, 100 and 101, are powered on. Responsive to the devices, 100 and 101, powering on, one of the protocol layers, 102 and 103, provides a synchronization request message to the other one of the protocol layers, 102 and 103, that includes at least one exchange rate. In this case, the protocol layer 102 provides the synchronization request message. The at least one exchange rate. e.g., a first exchange rate, could be any exchange rate supported by the device 100. For example, the at least one exchange rate could be a system default exchange rate for communications between the protocol layers, 102 and 103. The at least one exchange rate could also be a plurality of exchange rates supported by the device 100.

It should be noted that since the present protocol permits either device 100 or device 101 to initiate commands, either the protocol layer 102 or the protocol layer 103 could begin the initialization process as a matter of design choice. It should also be noted that the synchronization request and synchronization acknowledgment messages discussed in this example are unnumbered messages.

Responsive to receiving the synchronization request message from the protocol layer 102, the protocol layer 103 processes the synchronization request message to generate a synchronization acknowledgment message for the protocol layer 102. The synchronization acknowledgment message includes an exchange rate, e.g., a second exchange rate, supported by the device 101, that is equal too or lower than the highest exchange rate provided by the protocol layer 102, and which becomes the negotiated exchange rate. For example, if the at least one exchange rate provided in the synchronization request message is a default for communication exchange between the protocol layers, 102 and 103, the protocol layer 103 returns the default exchange rate in the synchronization acknowledgment message. If the at least one exchange rate provided in the synchronization request message is a plurality of exchange rates supported by the device 100, then the protocol layer 103 returns one of the plurality of exchange rates that is also supported by the device 101.

Responsive to receiving the synchronization acknowledgment message, the devices, 100 and 101, adjust their system settings to the negotiated exchange rate returned by the protocol layer 103. Responsive to negotiating the exchange rate, the protocol layers, 102 and 103, establish a connection between the devices, 100 and 101, to complete the initialization process.

Responsive to the connection establishment, the application programs 106–111 exchange communications over the connection at the negotiated exchange rate. Responsive to a change in system dynamics that causes an application program, e.g. 106, to require a faster exchange rate, an exchange rate request message is provided to the device's protocol layer, e.g. 102. For example, a large code update could cause the application program 106 to desire a faster exchange rate.

The exchange rate request message includes a suggested exchange rate for communication exchange over the connection. Responsive to receiving the exchange rate request message, the protocol layer 102 processes the request message to generate another synchronization request message for the protocol layer 103 that includes the suggested exchange rate. The protocol layer 103 processes the synchronization request message to generate a synchronization acknowledgement message that includes an exchange rate that is equal to or lower than the suggested exchange rate, and which becomes the renegotiated exchange rate.

To clarify, the suggested exchange rate provided in the synchronization acknowledgment message could be any exchange rate supported by the device 101 that is equal too or lower than the suggested exchange rate provided in the synchronization request message. Typically, however, the exchange rate provided in the synchronization acknowledgment message is the highest exchange rate currently supported by the device 101 that is equal to or lower than the suggested exchange rate. Thus, if the protocol layer 103 returns the suggested exchange rate in the synchronization acknowledgment message, then the suggested exchange rate becomes the negotiated exchange rate. If the protocol layer 103 returns a lower exchange rate in the synchronization acknowledgment message, the lower exchange rate becomes the negotiated exchange rate. In this way the protocol layers, 102 and 103, negotiate the highest common exchange rate between the devices, 100 and 101 based on an exchange rate suggested by the application program 106.

In a numeric example, if the protocol layer 102 provides a suggested exchange rate of 38400 kbps in the synchronization request message, the protocol layer 103 will return the highest rate supported by the device 101 that is equal to or lower than the 38400 kbps supported by the device 100. If the protocol layer 103 returns 38400 kbps in the synchronization acknowledgment message, the devices, 100 and 101, use 38400 kbps as the negotiated exchange rate. If the protocol layer 103 returns an exchange rate of 19200 kbps in the synchronization acknowledgment message, the devices, 100 and 101, use 19200 kbps as the negotiated exchange rate.

FIG. 3 is a message sequence chart illustrating another example of the initialization operation and a testing operation according to the present invention. In this example, because both devices, 100 and 101, include the same program code and can initiate commands, both devices, 100 and 101, provide a synchronization request message and receive a corresponding synchronization acknowledgment message in response to a device start-up.

On FIG. 3 the operation begins when the devices, 100 and 101, are powered on. Responsive to the device 100 powering on, the protocol layer 102 provides a synchronization request message to the protocol layer 103. In this example, the synchronization request message includes all of the exchange rates supported by the device 100. Responsive to receiving the synchronization request message from the protocol layer 102, the protocol layer 103 processes the synchronization request message to generate a synchronization acknowledgment message for the protocol layer 102 that includes an exchange rate for the device 101 that is equal too one of the exchange rates provided in the synchronization request message. The exchange rate returned in the acknowledgment message could be the highest common exchange rate between the devices, 100 and 101, or could be a default exchange rate for the devices, 100 and 101.

Substantially simultaneously, the protocol layer 103 provides a synchronization request message to the protocol layer 102 that includes all of the exchange rates supported by the device 101. Responsive to receiving the synchronization request message, the protocol layer 102 processes the synchronization request message from the protocol layer 103 to generate a synchronization acknowledgment message that includes the exchange rate provided by the protocol layer 103 in the synchronization acknowledgment message, and which becomes the negotiated exchange rate. Advantageously, however, the each protocol layer, 102 and 103, now has knowledge of all of the exchange rates supported by the other device.

Responsive to negotiating the exchange rate, the protocol layers, 102 and 103, establish a connection between the devices, 100 and 101, and the devices, 100 and 101, adjust their system settings to the negotiated rate. Responsive to determining the negotiated exchange rate and establishing the connection, the protocol layers 102 and 103 test the connection between the devices 100 and 101. During testing, the protocol layers 102 and 103, each provide a series of test and acknowledgement messages as illustrated on FIG. 3.

The test and acknowledgment messages are used to establish an error free connection between the devices, 100 and 101. Although those skilled in the art will appreciate that any number of test and acknowledgment messages could be used as a matter of design choice, in this case, five test messages are sent and acknowledged before the connection is declared ready for the exchange of communications.

The test messages each include a data field having a byte sequence N+1, N+2,,, where N is the test message number. The test acknowledgement messages acknowledge the receipt and validation of the test messages by returning a data field that includes the data received in the test message. If during testing, one of the test or acknowledgment messages fail, the protocol layers, 102 and 103, automatically begin the initialization process to re-negotiate the exchange rate and the above steps are repeated until a reliable connection is established.

It should be noted that in the above example, it is irrelevant which protocol layer begins the initialization process by providing the synchronization request message or begins the testing by providing the test message, but rather, only that each layer, 102 and 103, provides a synchronization request message, acknowledgment message, a test message, and test acknowledgment message to the other layer.

Figure 4:
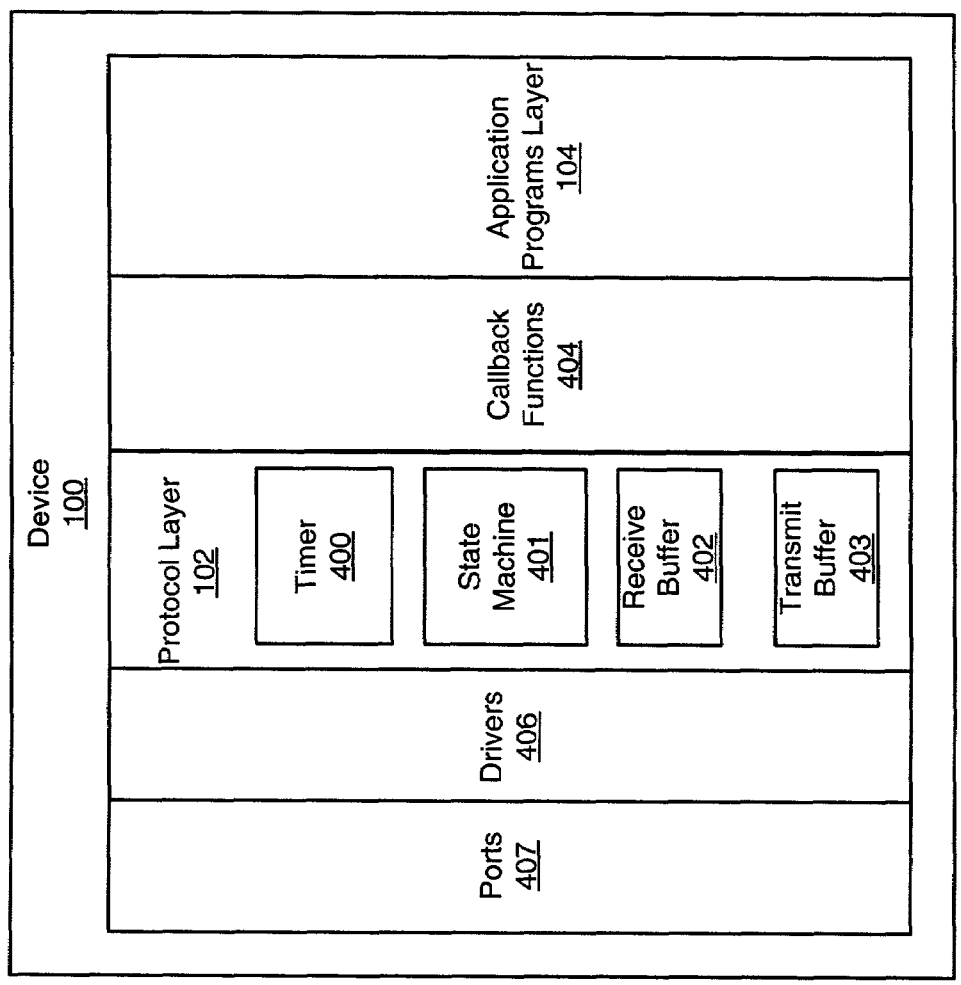
FIG. 4 is a software architecture for the protocol according to the present invention.

Software Architecture:

FIG. 4 depicts software architecture for the device 100. Those skilled in the art will appreciate that the software architecture for the device 100 is substantially similar to the software architecture for the device 101 and therefore the architecture for the device 101 is not shown to avoid redundancy. The device 100 comprises ports 407, drivers 406, the protocol layer 102, callback functions 404, and the application program layer 104. The protocol layer 102 comprises a protocol timer logic block 400, a protocol state machine logic block 401, a receive buffer 402, and a transmit buffer 403.

The ports 407 could be conventional ports for the exchange of communications with other devices. In one example of the present invention, the ports 407 are conventional serial ports for serial communications between devices. The drivers 407 could be conventional drivers that integrate with a host operating system and control the communication exchange between the ports 407 and the protocol layer 102. In one example of the present invention, the host operating system could be a commercial run-time operating system including a semaphore and some form of tasks. Alternatively, those skilled in the art will appreciate that other operating systems could be used as a matter of design choice.

The callback functions 404 are configured to provide communication exchange between the protocol layer 102 and the application program layer 104. Operationally, each application program in the application program layer 104 that processes information messages must register its source address and callback function with the protocol state machine 401 before receiving communications. Once registered, a sending application program sets the destination address, which determines where data is delivered. Advantageously, a single application program can register multiple destination addresses with the protocol state machine 401.

The state machine 401 maintains a table of source addresses and function pointers. The table is built through the registration process when an application program registers its source addresses with the state machine 401. The state machine 401 uses the transmit buffer 403 to store messages to be sent to another application program layer, e.g. 105. The state machine 401 uses receive buffer 402 to store messages received for the application program layer 104.

Operationally, when the state machine 401 receives an information message from another device, e.g. device 101, it looks up the destination address in the source address table and calls the appropriate one of the callback functions 404 to deliver the information message to a receiving application program in the application program layer 104. The state machine 401 also provides a supervisory acknowledgement message back to the sending protocol layer 103 to confirm receipt and validation of the information message. When the state machine 401 transmits an information message to another device, e.g. device 101, it receives the destination address from the sending application program and delivers an information message to the receiving protocol layer 103. Upon receiving a supervisory acknowledgement message from the protocol layer 103 indicating the information message was received validated and delivered, the state machine 401 provides an acknowledgement to the sending application program the indicates that the information message was delivered to the receiving application program in the device 101.

The state machine 401 uses the timer 400 following the transmission of an information message to the protocol layer 103. An acknowledgement message timer is started once the state machine 401 provides an information message. The timer is turned off once the state machine 401 receives a supervisory acknowledgement message from the receiving protocol layer 103. If the supervisory acknowledgement message from the receiving protocol layer 103 is not received before expiration of the timer, the information message is resent to the protocol layer 103. If an acknowledgement message is still not received after a pre-determined number of attempts, the state machine 401 provides a set response mode message to the protocol layer 103 that causes the protocol layers 102 and 103 to begin the initialization process and re-negotiate the exchange rate and re-establish the connection. While those skilled in the art will appreciate numerous methods of determining the timer period and number of attempts before a set response mode message is provided, in one example of the present invention, the time-out could be calculated as the maximum message size multiplied by the exchange rate multiplied by four. Additionally, the number of attempts made before an exchange rate renegotiation could be set at three.

Figure 5:
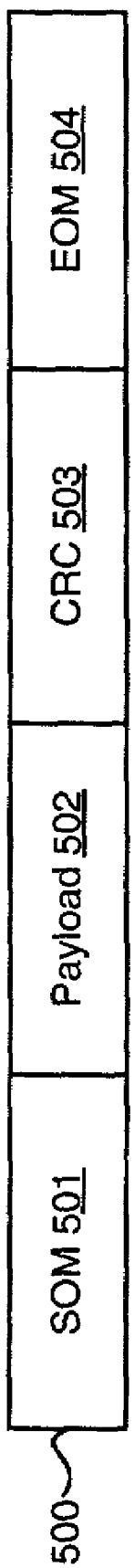
FIG. 5 is an example of a fundamental message for the protocol according to the present invention.

Fundamental Message Architecture FIGS. 5–8:

FIG. 5 depicts a fundamental message 500 for the protocol according to the present invention. The fundamental message comprises four fields beginning with a start of message (SOM) field 501 and ending with an end of message (EOM) field 504. A payload field 502 and CRC field 503 for error detection are included between the SOM field 501 and EOM field 504. The SOM field 501 indicates the beginning position of the payload field 502 and initiates the error checking for the message 500. The EOM field 504 delimits the end of the CRC error checking and terminates the message 500.

FIG. 6 depicts the payload field 502 of the fundamental message and the sub-fields that could be included in the payload field 502. It should be noted that the content of the payload field 502 is unrestricted and not all message types include all of the payload sub-fields shown on FIG. 6. As will become apparent from the following description, different message types, e.g. unnumbered, supervisory, and information message types include different payload sub-fields. Typically, however, the payload field 502 includes at least header information used by the protocol layers, 102 and 103, and the information to be transferred.

The payload field 502 could comprise one or more of a device sub-field 600, a control sub-field 601, a source address sub-field 602, a destination address sub-field 603, a message sequence sub-field 604, a message acknowledgement sub-field 605, a length sub-field 606, a data sub-field 607, and a reserve sub-field 608.

The first payload sub-field for all types of messages, supervisory, unnumbered, or information, is the device sub-field 600. The device sub-field 600 identifies the implementation version of the protocol.

The reserve sub-field 608 serves as a placeholder to accommodate future implementation of the protocol and for the addition of other features in the protocol.

The control sub-field 601 defines the type of message, e.g. supervisory, unnumbered, information, or supervisory receiver ready, supervisory reject, or supervisory receiver not ready message.

The source sub-field 602 identifies the device, e.g. 100, that provided the message. As will become apparent from the following description, the source sub-field 602 includes a unique source address for the callback function that initiated a data transfer.

The destination address sub-field 603 is used for routing information messages to the appropriate application program. The destination address sub-field 603 includes the destination address of the callback function that the data portion of the payload field 502 is intended for.

The message sequence sub-field 604, is included in information messages, and contains a sequence number that indicates the sequence of messages being transferred. In one example of the present protocol, the sequence numbers start at one and are incremented by one each time an information message is transmitted between the protocol layers, 102 and 103.

The message acknowledgment sub-field 605 is included in supervisory messages to acknowledge the receipt of an information message and contains the next message sequence number expected by the receiving protocol layer, e.g. 102.

The length sub-field 606 contains the number of bytes in the data sub-field 607. The data sub-field 607 contains the raw data transferred in an information message. For example, in the case of an unnumbered message, e.g. synchronization request and response messages, the data sub-field 607 includes at least one exchange rate.

Figure 7:
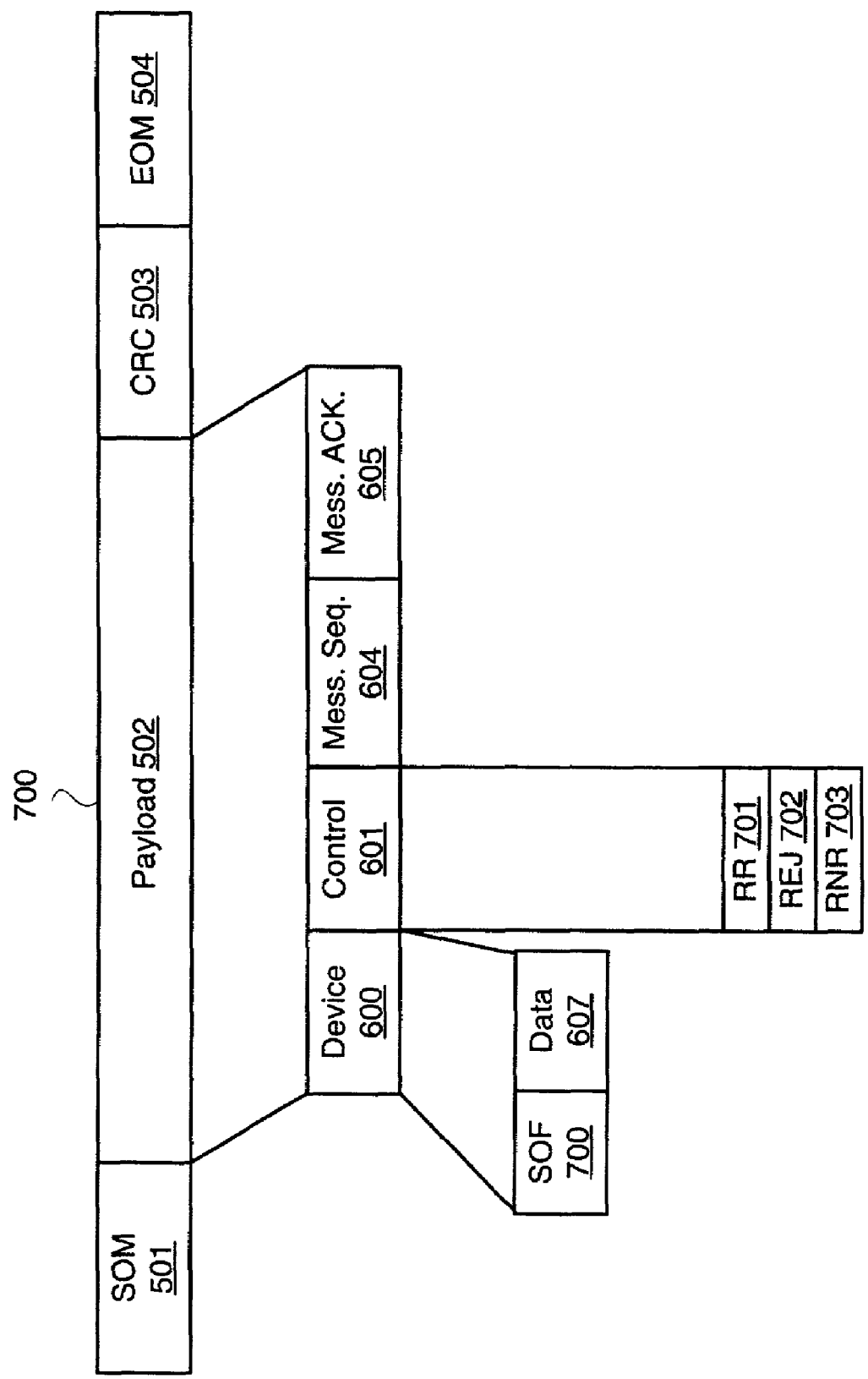
FIG. 7 is an example of a supervisory message for the protocol according to the present invention.

Supervisory Message FIG. 7

FIG. 7 depicts an example of a supervisory message 700. The supervisory message 700 comprises a SOM field 501, a payload field 502, a CRC field 503, and an EOM field 504. The payload filed 502 for the supervisory message 700 comprises a device sub-field 600, a control sub-field 601, a message sequence sub-field 604, and a message acknowledgement sub-field 605. The device sub-field 600 comprises a SOM flag 704 and a data field 607 for the raw data. The control sub-field 601 indicates the type of supervisory message and comprises one of a receiver ready (RR) flag 701, a reject flag (REJ) 702 or a receiver not ready flag (RNR) 703.

Supervisory messages acknowledge the receipt and validation of information messages, or an error condition in the receipt of an information message. There are generally three types of supervisory messages although other supervisory messages could be utilized as a matter of design choice. The first type of supervisory message is the supervisory receiver ready message indicated by the RR flag 701. The supervisory receiver ready message indicates that an information message was received, successfully validated, and delivered to an application program by a receiving protocol layer, e.g. 103. The supervisory receiver ready message also indicates to the sending protocol layer, e.g. 102, that the receiving protocol layer 103 is ready to receive additional information messages.

The second type of supervisory message is the reject message indicated by the REJ flag 702. The supervisory reject message is used by the receiving protocol layer, e.g. 103, to indicate an error condition in the reception of an information message, such as a bad sequence number. The supervisory reject message also requests retransmission of the last sent information message identified in the message acknowledgment field 605. In some examples of the present protocol, the supervisory reject message is only used when the message sequence number is unexpected. In this case the received information message is not delivered to the destination address, but rather, must be re-sent with the proper sequence number by the sending protocol layer, e.g. 102.

The third type of supervisory message is the receiver not ready message indicated by the RNR flag 703. The supervisory receiver not ready message is used to indicate a temporary busy condition of a receiving protocol layer, e.g. 103, caused by internal constraints that prevent reception of additional information messages. The supervisory receiver not ready message confirms the sequence and data integrity of the last sent information message. When the condition is cleared, the receiving protocol layer 103 provides a supervisory receiver ready message to the sending protocol layer 102 to indicate that the sending of information messages can continue.

The CRC field 503 includes the CRC error detection and data validation algorithm. The CRC is computed on the entire payload, excluding control flags. Operationally, CRC values are calculated using polynomial division. A polynomial is chosen to be the divisor. The data upon which the CRC is calculated serves as the dividend. The CRC is the remainder that is left once the division process is complete. The size of the CRC is dependent upon the polynomial divisor chosen. In one example of the present invention, the algorithm implements a two byte (16 bit) CRC. If a received information message contains CRC errors, the receiving protocol layer, e.g. 102, deletes the received information message and the state machine 401 increments the statistic table for CRC errors.

Figure 8:
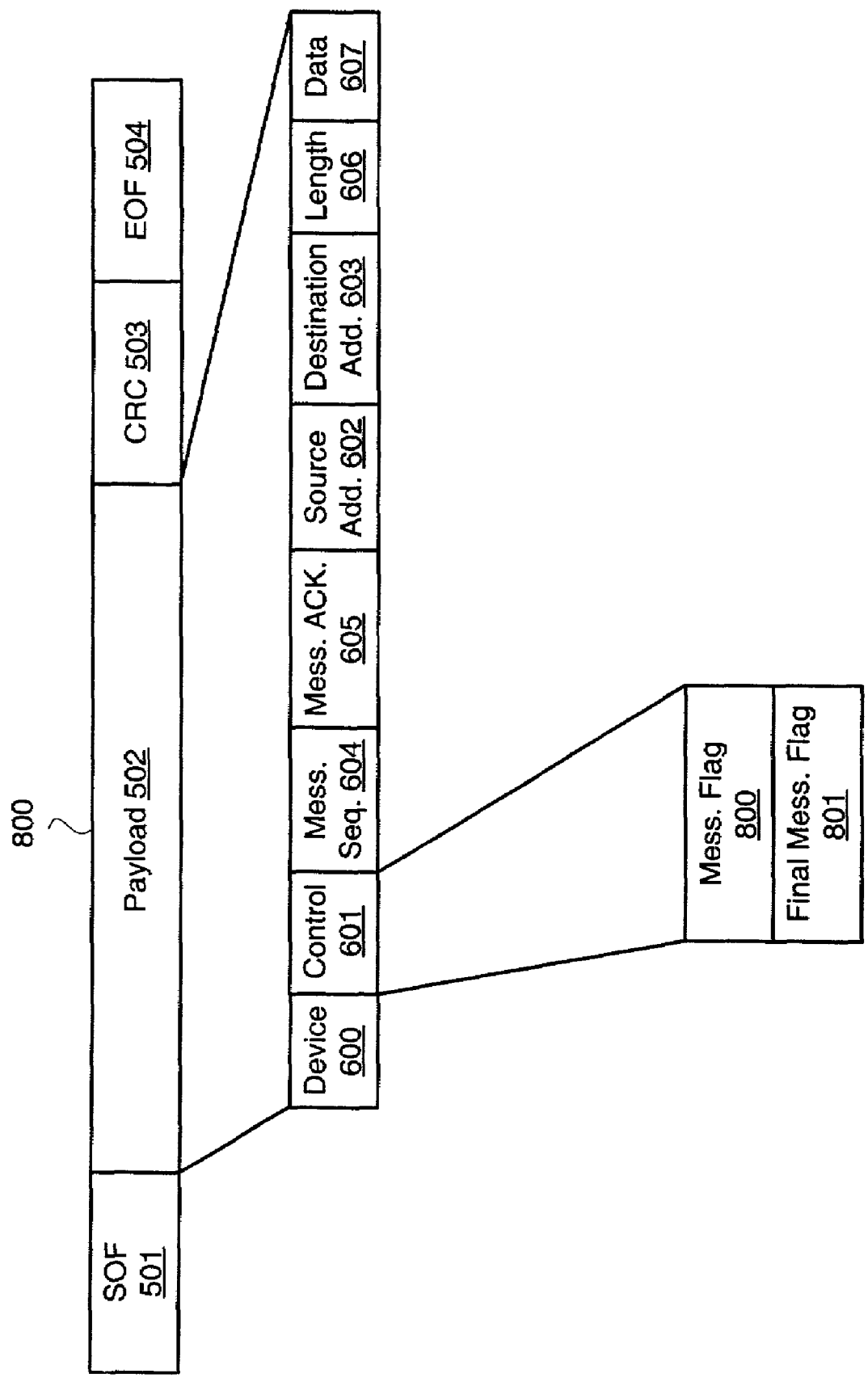
FIG. 8 is an example of an information message for the protocol according to the present invention.

Information Message FIG. 8:

FIG. 8 depicts an example of an information message 800. The information message 800 comprises a SOM field 501, a payload field 502, a CRC field 503, and an EOM field 504. The payload filed 502 for the information message 800 comprises a device sub-field 600, a control sub-field 601, a message sequence sub-field 604, a message acknowledgement sub-field 605, a source address sub-field 602, a destination address sub-field 603, a length sub-field 606 and a data sub-field 607. The control sub-field 601 includes a message flag 800 and a final message flag 801.

Information messages transfer sequenced data between the devices, 100 and 101. The protocol layer in the receiving one of the devices, 100 and 101, acknowledges an information message, with a supervisory message. If the data to be transferred in an individual information message is greater than a maximum size of the data sub-field 607, the data is transferred in multiple information messages. In this case, all information messages except for the last information message will include a final message flag 801 set to zero to indicate that additional information messages will be provided. The final information message in a sequence includes a final message flag 801 set to one to indicate the completion of a sequence of information messages.

Additional Examples of Operation FIGS. 9–12:

FIG. 9 is logical diagram depicting the messages that could be received by the devices, 100 and 101, and the response messages or action taken by the devices, 100 and 101. It should be noted that the following description applies equally to the devices, 100 and 101, although the device 100 is used as an example in the following discussion.

On FIG. 9, the device 100 could receive an information message that cannot be validated by the state machine 401. The validation process could fail for numerous reasons. Some examples include without limitation, an unknown or unimplemented control field, a data field that exceeds the maximum raw data block size, a serial line error, or a CRC error. If an information message validation fails, the state machine 401 deletes the message from the receive buffer 402, increments the statistic table for the error, and waits for the timer in the sending protocol layer 103 to time out. Once the timer times out, the protocol layer 103 retransmits the information message to the device 100.

The device 100 could also receive an information message that includes an unexpected sequence number. In this case, the state machine 401 provides a supervisory reject message to the sending protocol layer 103 and awaits retransmission of the information message with the correct sequence number. The supervisory reject message also includes the sequence number expected by the state machine 401.

The device 100 could also receive a time-out condition from the timer 400 during the receipt of an information message. The timer 400 starts a receive timer at the detection of the SOM field 501 in the information message. The receive timer is turned off at detection of the EOM field 504. If a receive time-out condition occurs prior to the EOM field 504, the state machine 401 ignores the received characters and waits for the information message to be re-sent by the sending protocol layer 103.

The device 100 could also receive an information message that is validated and deliverable. In this case, the state machine 401 provides a supervisory receiver ready or a supervisory receiver not ready message to the sending protocol layer 103. Both of these messages contain a message acknowledgement number to acknowledge the receipt of a valid information message. The supervisory receiver ready message indicates that the state machine 401 is ready to receive another information message. The supervisory receiver not ready message indicates that the state machine 401 is not ready to receive additional information messages.

The device 100 could also receive a test message provided during the initialization process. In this case the state machine 401 provides a test acknowledgment message to the sending protocol layer 103 that includes a copy of the test data provided in the test message.

The device 100 could also receive a reset message. A reset message indicates that a user is requesting that the connection be reset. Reset messages are not acknowledged, but rather, the state machine 401 enters the initialization process to re-negotiate the exchange rate and establish the connection between the devices, 100 and 101.

The device 100 could also receive a synchronization request message during the initialization process. The synchronization request message indicates initialization of the connection. The state machine 401 responds with a synchronization acknowledgment message indicating the renegotiated exchange rate. The synchronization request message could be generated during device start-up or in response to an unrecoverable error in the exchange of communications.

The device 100 could also receive a message reject message. A message reject indicates that the last message sent by the device 100 includes an unknown destination address and is undeliverable. The message reject message includes a cause, source address and destination address field. In this case the state machine 401 removes the undeliverable message from the transmit buffer 403 and provides an indication to the sending application program that the message is undeliverable.

The device 100 could also receive an abort sequence message. The abort sequence message indicates a premature termination of a data transfer. In this case, the state machine 401 aborts the current reception and deletes any received data.

FIG. 10 is logical diagram depicting the messages that could be received by one of the devices, 100 and 101, in response to the transmission of an information message. It should be noted that the following description applies equally to the device 101.

On FIG. 10 the device 100 could receive a synchronization request message in response to the transmission of an information message. Since the synchronization request message is not in response to a power on, the synchronization request message indicates that either the connection is down or an application program is requesting an exchange rate renegotiation. Any outstanding messages waiting to be sent are removed from the transmit buffer 403 and must be re-provided by the application programs layer 405.

The device 100 could also receive a supervisory receiver ready message in response to the transmission of an information message. Receiving this message indicates that the receiving protocol layer 103 has acknowledged and delivered to the registered application the last sent information message.

The device 100 could also receive a time-out condition in response to the transmission of an information message. An acknowledgment message timer is started in the timer 400 when the state machine 401 transmits an information message. The timer is turned off when the state machine 401 receives a supervisory message with the correct acknowledgment sequence number. If the timer times-out before a supervisory acknowledgment message is received, the state machine 401 re-transmits the information message. If after a pre-determined number of attempts, the information message is still not acknowledged, the state machine 401 provides a synchronization request message to re-establish the connection and/or renegotiate the exchange rate.

The device 100 could also receive a supervisory reject message in response to the transmission of an information message. The supervisory reject message indicates that an unexpected sequence number was provided in the last information message. The number of the message expected is also included in the message acknowledgement field 605 of supervisory reject message. If all retries are not exhausted, the state machine 401 re-transmits the information message. Otherwise the state machine 401 provides a synchronization request message to re-establish the connection.

The device 100 could also receive a supervisory receiver not ready message in response to the transmission of an information message. The supervisory receiver not ready message indicates that the protocol layer 103 in the device 101 is not ready to receive another information message. The state machine 401 starts the acknowledgement timer and waits for the next response message. The protocol layer 103 may send another supervisory receiver not ready message before the timer expires to reset the timer. The protocol layer 103 could also provide a supervisory receiver ready message to the device 100. In this case the state machine 401 re-sends the information message to the device 101.

The device 100 could also receive a message reject in response to the transmission of an information message. The message reject indicates that the last information message provided by the state machine 401 includes an unknown destination address. The state machine 401 removes the information message from the transmit buffer 402 and provides an indication to the sending application program that the information is currently undeliverable.

Figure 11:
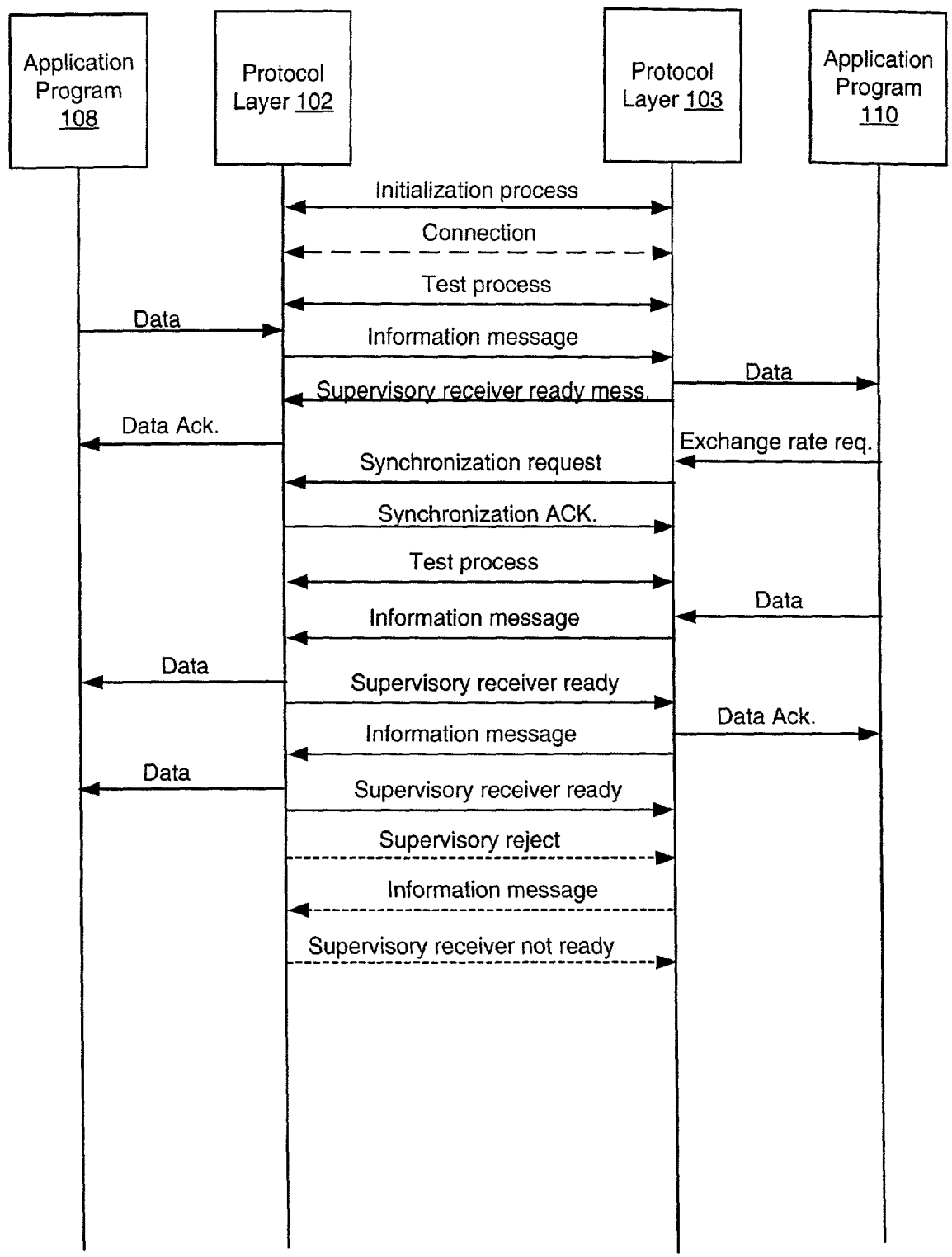
FIG. 11 is a message sequence chart illustrating another example of the operation of the protocol according to the present invention.

FIG. 11 is a message sequence chart illustrating additional operations of the protocol according to the present invention. On FIG. 11 the initialization and test operation of FIG. 3 is invoked in the protocol layers, 102 and 103, when the devices, 100 and 101, are powered on. Responsive to the connection establishment and testing, the application program 108 provides a data message to the protocol layer 102 that includes data information for the application program 110. The protocol layer 102 generates and provides an information message that includes the data information for the protocol layer 103. Responsive to receiving the information message, the protocol layer 103 validates the information message and provides the data information to the application program 110. Substantially simultaneously, the protocol layer 103 generates and provides a supervisory receiver ready message to the protocol layer 102. The supervisory receiver ready message indicates to the protocol layer 102 that the data was validated and delivered to the application program 110. Responsive to receiving the supervisory receiver ready message, the protocol layer 102 generates a data acknowledgment message for the application program 108. The data acknowledgement message indicates to the application program 108 that the data was delivered to the application program 110 by the protocol layer 103. Advantageously, the data acknowledgment message permits the application program 108 to move on to the next task quicker while keeping the device 100 and the device 101 synchronized. Also advantageously, the data acknowledgment message provides auto-synchronization between the device 100 and the device 101 without the receiving application program 110 providing a response message to the application program 108 indicating receipt of the information.

Responsive to a change in the system dynamics that causes the application program 110 to require a faster exchange rate, an exchange rate request message is provided to the protocol layer 103. The exchange rate request message includes a suggested exchange rate for communication exchange over the connection. Responsive to receiving the exchange rate request message, the protocol layer 103 processes the request message to generate another synchronization request message for the protocol layer 102 that includes the suggested exchange rate. The protocol layer 102 processes the synchronization request message to generate a synchronization acknowledgement message that includes an exchange rate that is equal or lower than the suggested exchange rate, and which becomes the renegotiated exchange rate. Responsive to renegotiating the exchange rate, the protocol layers, 102 and 103, test the connection by exchanging a series of test and acknowledgment messages in full duplex mode over the connection at the renegotiated exchange rate as shown in FIG. 3.

If the testing operation fails, the protocol layers, 102 and 103, again invoke the initialization process to renegotiate the exchange rate to the next lower exchange rate. If the connection is confirmed, as illustrated in FIG. 11, the application program 110 is allowed to provide a data message to the protocol layer 103 that includes data information for the application program 108. Responsive to receiving the data information, the protocol layer 103 generates and provides an information message that includes the data information for the application program 108. Responsive to receiving the information message, the protocol layer 102 validates the message and provides the data information to the application program 108. Substantially simultaneously, the protocol layer 102 generates and provides a supervisory receiver ready message to the protocol layer 103 that indicates that the data was validated and delivered to the application program 108. Responsive to receiving the supervisory receiver ready message, the protocol layer 103 generates a data acknowledged message for the application program 110 that indicates that the data was delivered to the application program 108 by the protocol layer 102. The protocol layer 103 also provides the next information message to the protocol layer 102. Responsive to receiving the information message, the protocol layer 102 validates the message and provides the data information to the application program 108. Substantially simultaneously, the protocol layer 102 generates and provides another supervisory receiver ready message to the protocol layer 103 that indicates that the data was validated and delivered to the application program 108.

In another example of the operation, if the protocol layer 102 could not validate an information message, the protocol layer 102 generates a supervisory reject message for the protocol layer 103 that causes the protocol layer 103 to retransmit the information message. The example of a supervisory reject message and the retransmission of the information message are indicated on FIG. 11 by dashed lines.

In another example of the operation, if the protocol layer 102 was busy and could not receive additional information messages, the protocol layer 102 generates a supervisory receiver not ready message for the protocol layer 103 that causes the protocol layer 103 to pause the transmission of additional information messages until resources in the protocol layer 102 are freed. The example of the supervisory receiver not ready message is indicated on FIG. 11 by the dashed line.

The above-described elements can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method for communicating between devices, the method comprising:
   sending a first synchronization request message from a first device to a second device, the first synchronization message including a first exchange rate;
   receiving a first synchronization acknowledgement message in the first device, the first synchronization acknowledgement message including one of the first exchange rate and a second exchange rate as a negotiated exchange rate;
   responsive to the negotiated exchange rate, establishing a connection between the first device and the second device; and
   responsive to establishing the connection, sending communications to the second device over the connection at the negotiated exchange rate.

2. The method of claim 1, wherein
   the first synchronization message includes a plurality of first exchange rates, and
   the first synchronization acknowledgement message includes one of the plurality of first exchange rates as the negotiated exchange rate.

3. The method of claim 2, further comprising:
   adjusting a first device exchange rate to the negotiated exchange rate; and
   adjusting a second device exchange rate to the negotiated exchange rate.

4. The method of claim 3, further comprising:
   testing the connection between the first device and the second device at the negotiated exchange rate.

5. The method of claim 4, further comprising:
   in the first device, receiving a suggested exchange rate from an application program;
   renegotiating the exchange rate between the first device and the second device to the suggested exchange rate; and
   sending further communications to the second device over the connection at the suggested exchange rate.

6. The method of claim 5, wherein the step of renegotiating the exchange rate comprises:
   sending a second synchronization request message to the second device that includes the suggested exchange rate; and
   receiving a second synchronization acknowledgement message, the second synchronization acknowledgement message including the suggested exchange rate.

7. The method of claim 6, further comprising:
   adjusting the first device exchange rate to the suggested exchange rate; and
   adjusting the second device exchange rate to the suggested exchange rate.

8. The method of claim 7, further comprising:
   testing the connection between the first device and the second device at the suggested exchange rate.

9. The method of claim 8, wherein the suggested exchange rate is highest common exchange rate between the first device and the second device.

10. The method of claim 8, wherein the step of testing the connection comprises:
    exchanging full duplex test messages and test acknowledgment messages between the first device and the second device at the suggested exchange rate.

11. The method of claim 8, further comprising:
responsive to an error during testing, renegotiating the exchange rate between the first device and the second device to a lower exchange rate; and
sending further communications to the second device at the lower exchange rate.

12. The method of claim 1, wherein the step of sending the communications to the second device comprises
providing an information message to the second device that includes the communications; and further comprising
processing the information message to provide a supervisory response message to the first device.

13. The method of claim 12,
wherein the supervisory response message indicates a validation of the information message condition.

14. The method of claim 12,
wherein the supervisory response message indicates an error in the information message condition.

15. The method of claim 12,
wherein the supervisory response message indicates the validation of the information message condition and a receiver not ready condition.

16. The method of claim 1, wherein the communications are packetized communications.

17. The method of claim 1, wherein the communications are serial communications.

18. A machine readable medium having stored thereon machine readable instructions, the instructions comprising:
first instructions operational when executed on a first device to send a first synchronization request message to a second device, the first synchronization message including a first exchange rate, and to receive a first synchronization acknowledgement message, the first synchronization acknowledgement message including one of the first exchange rate and a second exchange rate as a negotiated exchange rate; and wherein
the first instructions are further operational to cooperate in establishing a connection between the first device and the second device, and to send communications to the second device over the connection at the negotiated exchange rate.

19. The machine readable medium of claim 18, wherein the first instructions are operational to include a plurality of exchange rates in the first synchronization request message; and further comprising
second instructions operational when executed on a second device to process the first synchronization request message to provide the first synchronization acknowledgement message to the first device, and include one of the plurality of exchange rates in the first synchronization acknowledgement message as the negotiated exchange rate.

20. The machine readable medium of claim 19, wherein the first instructions are operational to adjust a first device exchange rate to the negotiated exchange rate, and the second instructions are operational to adjust a second device exchange rate to the negotiated exchange rate.

21. The machine readable medium of claim 20, wherein the first instructions and the second instructions are operational to test the connection between the first device and the second device at the negotiated exchange rate.

22. The machine accessible medium of claim 21, wherein the first instructions are operational to receive a suggested exchange rate from an application program, and the first instructions and the second instructions are operational to renegotiate the exchange rate between the first device and the second device to the suggested exchange rate, and to exchange further communications between the first device and the second device over the connection at the suggested exchange rate.

23. The machine accessible medium of claim 22, wherein the first instructions are operational to provide a second synchronization request message to the second device that includes the suggested exchange rate and the second device instructions are operational to process the second synchronization request message to provide a second synchronization acknowledgement message to the first device, the second synchronization acknowledgement message including the suggested exchange rate.

24. The machine readable medium of claim 23, wherein the first instructions are operational to adjust the first device exchange rate to the suggested exchange rate and the second instructions are operational to adjust the second device exchange rate to the suggested exchange rate.

25. The machine readable medium of claim 24, wherein the first instructions and the second instructions are operational to test the connection between the first device and the second device at the suggested exchange rate.

26. The machine readable medium of claim 25, wherein the suggested exchange rate is a highest common exchange rate between the first device and the second device.

27. The machine readable medium of claim 25, wherein the first instructions and the second instructions are operational to cause exchange of full duplex test messages and test acknowledgment messages between the first device and the second device at the suggested exchange rate.

28. The machine readable medium of claim 25, wherein the first instructions and the second instructions are operational to renegotiate the exchange rate between the first device and the second device to a lower exchange rate responsive to an error during the exchange of the test messages and to cause exchange of further communications between the first device and the second device at the lower exchange rate.

29. The machine readable medium of claim 18, wherein the first instructions are operational to send an information message to the second device that includes the communications and to receive a supervisory response message from the second device.

30. The machine accessible medium of claim 29, wherein the supervisory response message indicates a validation of the information message condition.

31. The machine accessible medium of claim 29, wherein the supervisory response message indicates an error in the information message condition.

32. The machine accessible medium of claim 29, wherein the supervisory response message indicates the validation of the information message condition and a receiver not ready condition.

33. The machine accessible medium of claim 18, wherein the communications are packetized communications.

34. The machine accessible medium of claim 18, wherein the communications are serial communications.

35. A point-to-point communication apparatus, comprising:
a first device adapted for sending to a second device a first synchronization request message including a first exchange rate, receiving a first synchronization acknowledgement message generated in response to the first synchronization request, the first synchronization acknowledgement including as a negotiated exchange rate one of the first exchange rate and a second exchange rate, establishing a connection with the second device, and for sending to the second device communications at the negotiated exchange rate.

36. The communication apparatus of claim 35, wherein the second device is configured to provide:

a data acknowledgment message that includes an indication for a first application program, the indication confirming delivery of information sent by the first application program to a second application program.

37. The communication apparatus of claim 35, wherein the synchronization request message comprises a plurality of exchange rates and the synchronization acknowledgment message comprises one of the plurality of exchange rates.

38. A computer-readable data signal encoded on a medium of transmission, the data signal comprising:

a first synchronization acknowledgement message generated by a first device in response to reception of a first synchronization request message including a first exchange rate, the first synchronization acknowledgement message including one of the first exchange rate and a second exchange rate as a negotiated exchange rate.

39. The data signal of claim 38, wherein the first synchronization request message includes a plurality of first exchange rates supported by the first device.

\* \* \* \* \*